United States Patent [19]

Daniels et al.

[11] Patent Number: 4,463,444
[45] Date of Patent: Jul. 31, 1984

[54] WORD PROCESSING SYSTEM HAVING A FORMATTING BIDIRECTIONAL PRINTER

[75] Inventors: Paul R. Daniels, Round Rock; Daniel J. Moore; Ha H. Nguyen, both of Austin, all of Tex.

[73] Assignee: International Business Machines Corporation, Armonk, N.Y.

[21] Appl. No.: 314,940

[22] Filed: Oct. 26, 1981

[51] Int. Cl.³ .............................................. G05B 1/01
[52] U.S. Cl. ..................................... 364/900; 400/323
[58] Field of Search ................ 364/200, 900; D14/50; 400/323

[56] References Cited

U.S. PATENT DOCUMENTS

| | | | |
|---|---|---|---|
| 3,764,994 | 10/1973 | Brooks et al. | 364/200 |
| 3,970,183 | 7/1976 | Robinson et al. | 400/323 |
| 4,203,678 | 5/1980 | Nordstrom et al. | 400/323 |

OTHER PUBLICATIONS

*IBM Technical Disclosure Bulletin*, vol. 23, No. 10, Mar. 1981, p. 4415, New York, U. S., B. A. Smith et al.: "Printer Throughput Enhancements".
*Hewlett Packard Journal*, vol. 29, No. 15, Nov. 1978, pp. 8–19, J. J. Ignoffo et al.: "Managing Dot-Matrix Printing With a Microprocessor".
*IBM Technical Disclosure Bulletin*, vol. 22, No. 1, Jun. 1979, pp. 269–271, New York, U. S., D. O. Hays et al.: "Standard Printer or I/O Adapter Control Method and Apparatus".

*Primary Examiner*—Gareth D. Shaw
*Assistant Examiner*—Tim A. Wiens
*Attorney, Agent, or Firm*—J. B. Kraft

[57] ABSTRACT

A word processing system is provided having a bidirectional printer with formatting capability. The system includes a word processor having means for outputting a stream of sequential data readable in only one direction. The data comprises blocks of character data representative of the characters to be printed interspersed with blocks of control data representative of the format in which the characters are to be printed; each block of control data has an immediately preceding control block identifier. The bidirectional printer includes means for receiving the stream of sequential data, means for scanning the stream of data and means for inserting a control block identifier at the end of each control block which identifier corresponds to the identifier preceding the control block, whereby the stream of sequential data is made readable in both the forward and reverse directions within the printer.

5 Claims, 4 Drawing Figures

WORD PROCESSING SYSTEM HAVING A FORMATTING BIDIRECTIONAL PRINTER

DESCRIPTION

1. Technical Field

This invention relates to text or word processing systems, i.e., information processing systems where the processing affects the format of the information. More particularly, it relates to the utilization of printers with some formatting capability in association with the word or text processor.

2. Background Art

In prior art information processing systems, there has traditionally been a dividing line between data processing systems and text or word processing systems. The older data processing field developed over the past forty years is directed to information processing the primary purpose of which is to affect the value of the information being processed. The processing involves mathematical and other computational operations such as ordering and sorting which affect the substance or value of the information. In general, data processing is not concerned with format of the information except to the extent necessary to make the information readable when printed out on conventional printers associated with data processing equipment such as wire matrix printers. Since form was of little consequence, the printers did not have any formatting capability other than the constraints required of the printed page. The printers essentially printed out what was directly provided to them in the data stream being input from the data processor.

On the other hand, in the newer word or text processing field which has developed over the past ten years, the value or substance of the information is of minor consequence. Word processing is concerned with the formatting of alphanumeric data into a format or arrangement suitable for specified printed documents which are to be read or discerned by the public, e.g., letters, text books, magazines and newspapers. Initially in such word processing systems, substantially all of the formatting was done in the word processor. A word or text processor conventionally comprises a keyboard entry display terminal, storage means, and some sort of central processor. The operator utilizing the display arranges the information into a selected alphanumeric line and page format. Then, data representative of the selected format and the alphanumeric data is transmitted directly to the printer which in turn prints the previously formatted document.

In recent years, the art has been seeking new approaches increasing the throughput, i.e., the production of such word or text processing systems. One approach for increasing the throughput has been to attempt to give the printer some degree of formatting capability. To the extent that a printer would have formatting capability, the word processor would be released to carry out further word or text processing as the primary or foreground task while the printer could still continue simultaneously to complete its formatting functions as a background task. The result would be some significant savings in word processor time.

Since most word or text processors read or scan sequential data streams being processed in one direction only, problems have been encountered utilizing such one directional data streams in bidirectional printers when such printers have a formatting capability which requires sequential data streams supplied to the printer to be read in both the forward and reverse directions. The present invention provides a solution to this problem.

DISCLOSURE OF THE INVENTION

In accordance with the present invention, a bidirectional printer with formatting capability is provided which has means for receiving an input of a sequential data stream readable in one direction only. The printer includes means for sequentially storing the data stream which comprises blocks of data representations of the characters to be printed and control data blocks representative of the format in which the characters are to be printed interspersed with said character data blocks. The stored received data further includes control block identifier data at sequential storage positions immediately preceding the control data block. The printer includes means for scanning this stored received data and means for inserting control block identifier data at the end of each control block which identifier data corresponds to the identifier data which preceded the control block. In this manner, the stream of sequential data is made readable both in the forward and reverse direction and thus utilizable by the bidirectional printer.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
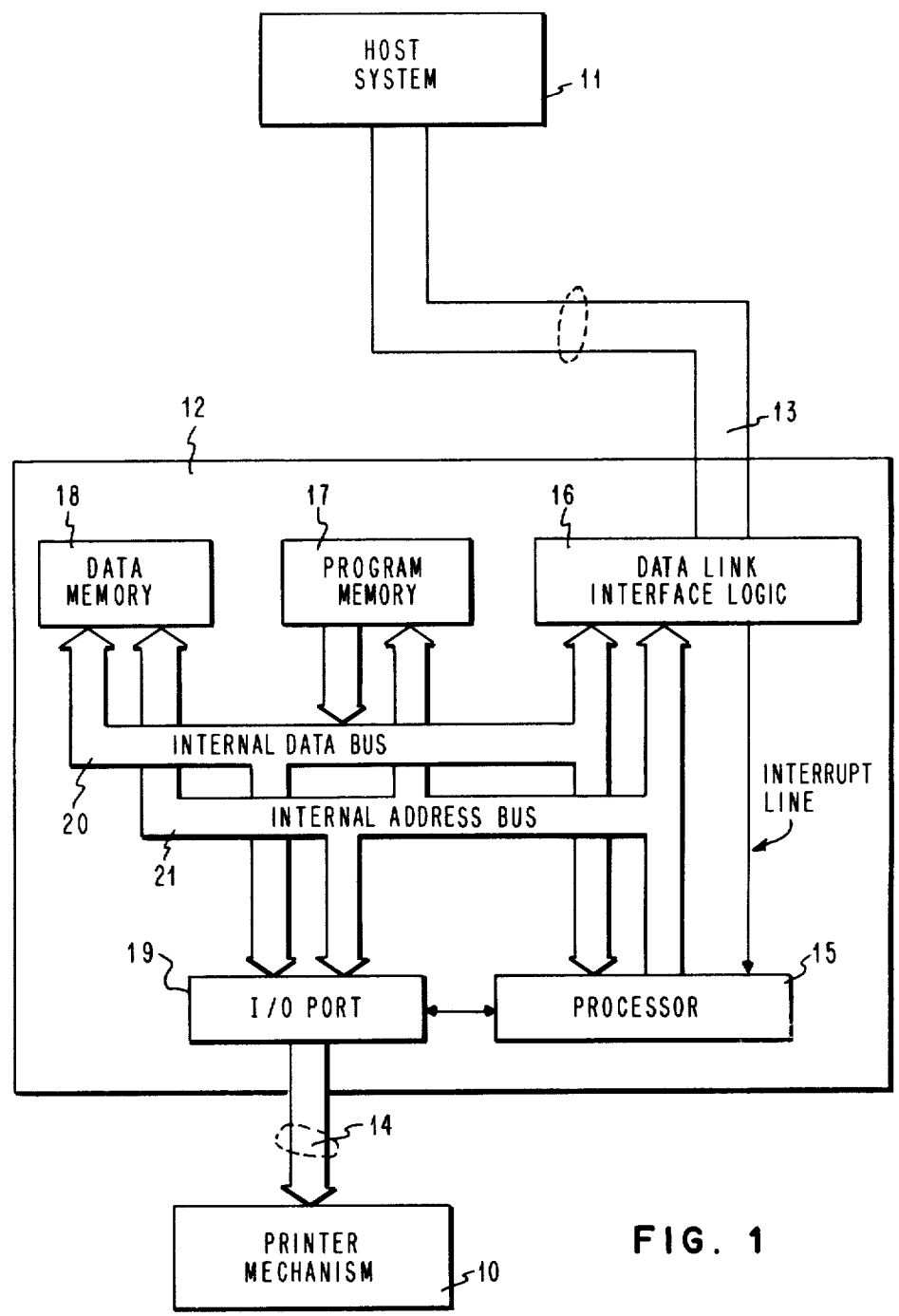
FIG. 1 is a diagrammatic representation of the logic and apparatus which may be used to carry out formatting expedients of the present invention.

The logic and apparatus for carrying out the present invention is shown in FIG. 1. The system comprises a printer 10 which may be any conventional impact printer apparatus used in connection with word or text processing systems to provide letter quality documents. The host system 11 may be any standard text processing or word processing system, preferably one having a keyboard entry display; a typical system which may be used for the whole system is described in co-pending application Ser. No. 273,561, Filed June 16, 1981, R. E. Berry et al, assigned to the assignee of the present invention.

The printer used in the present invention has a formatting capability. This formatting is carried out in formatting unit 12 associated with the printer mechanism 10. Suitably, formatting unit 12 may be used to carry out such simple document formatting functions as justification, margin release, or the setting of designated units for tabbing. By carrying out such functions, formatting unit 12 releases the host system 11 from such simple formatting expedients to thereby permit the whole system to carry out other functions. The host system 11 communicates with the formatting unit 12 over cable 13. The data transmitted over cable 13 to formatting unit 12 represents text character data to be printed on printer mechanism 10 as a document in which data is already substantially formatted. The formatting unit will perform its additional formatting function and transmit the final formatted information to the printer mechanism over buss 14. This information will be utilized to control the printer to produce the final "hard copy" document on printer mechanism 10 in the conventional manner.

Formatting unit 12 contains a processor 15 which is a microprocessor controlling all of the operations carried out within formatting unit 12. The formatting unit 12 further contains data link interface logic 16 which serves as the interface between the host system 11 and the formatting unit 12. Program memory unit 17 includes the operational programs utilized by microprocessor 15 in carrying out the various formatting functions within unit 12. Data memory unit 18 provides for the storage of all of the formatted data including that provided by host system 11 and that provided by the formatting unit 12 which will eventually be communicated to control the printer mechanism 10 over buss 14. I/O port unit 19 operates in a conventional manner to serve as the interface between formatting unit 12 and the printer mechanism 10 to provide formatted data necessary to operate the printer mechanism 10 over buss 14.

Now, using the logic and apparatus described above with respect to FIG. 1, the operations involved in the present invention will be described with respect to the flow charts in FIGS. 2 and 3. In the following description, it should be understood that the only formatting expedient to be fully described will be the expedient involving the steps of first scanning the stream of sequential data input into formatting unit 12 in order to identify character control blocks and the subsequent insertion of a control block identifier at the end of each control block which corresponds to the identifier preceding the control block whereby the stream of sequential data is made readable in both the forward and reverse directions. This is followed by the brief description of a formatting step which illustrates how the character control block is recognized during the subsequent formatting operation so that control data may be distinguished from the actual character or graphic data. It is recognized that during formatting operation, formatting unit 12 associated with the printer will also be used to carry out other formatting operations. However, these will not be described because they are not pertinent to the present invention.

Figure 2:
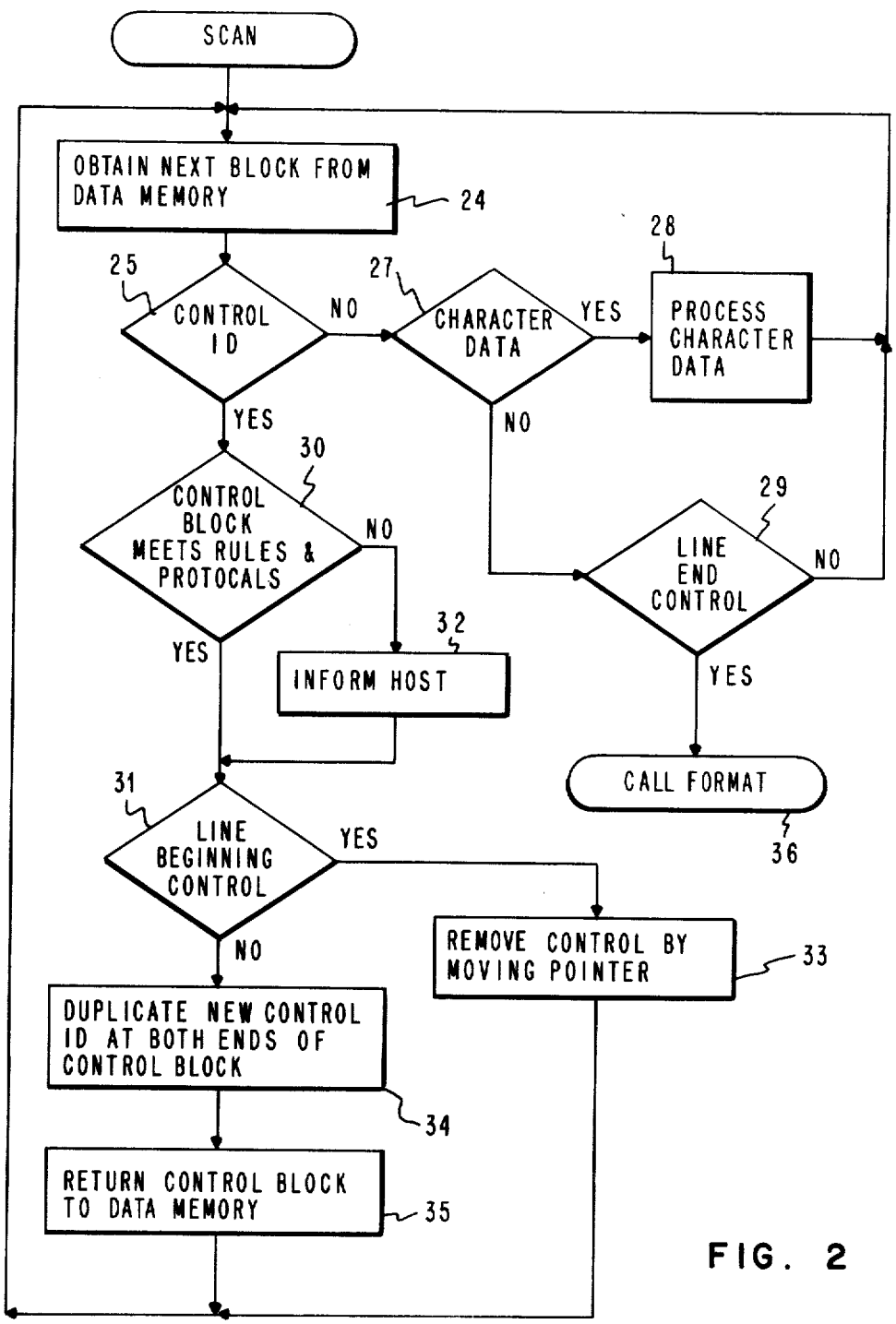
FIG. 2 is a flow chart of the process by which the initial scanning of the stream of sequential data received by the printer is carried out.

Now with respect to FIG. 2, let us assume that data which has been formatted during operations in the host word processing system 11 has been communicated to formatting unit 12 of the printer through cable 13 and processed through data link interface logic 16 in the formatting unit and then input into data memory unit 18 through internal data buss 20. Host system 11 has already formatted the document to be printed so that characters are already formatted line by line and are thus sequentially stored in data memory 18 line by line. In carrying out the present operation, the microprocessor 15 through internal address buss 21 addresses the next line in data memory 18 and calls the scan routine shown in FIG. 2 with respect to that line. The data representative of a document line is stored in data memory as a sequential stream having the structure shown in FIG. 4 labeled "Before Scan". This data contains blocks of control data 22 interspersed with blocks of character data 23. Each block of data contains a plurality of data bytes. Thus, following the process shown in FIG. 2 under the control of processor 15, the next block of data is obtained from data memory 18 as indicated in step 24.

Now, processor 15 must determine whether block of data is a block of control data or character data. By control data, we mean data which contains some formatting information while blocks of character data contain graphic representations of a group of characters to be printed but no formatting information. In order that blocks of control data be distinguished from blocks of character data, it is a customary practice to put an identifier at the leading edge of a control data block. As shown in FIG. 4 in the upper data stream, the identifier 26 may conveniently be the first byte of data in the control data block which precedes the remainder of the control data in the block when the data stream is run in the conventional manner from left to right as indicated by the arrow. Thus, step 25, FIG. 2, determination is made by microprocessor 15 as to whether control identifier 26 is present in the next block of data. If there is no control ID (identifier), then determination is made, step 27, as to whether the data is character data, i.e., data representative of the actual characters to be printed. This determination is made under the control of processor 15. If processor 15 determines that it is character data of the type indicated by block 23 in FIG. 4, then, step 28, whatever additional processing may be required on the character data during this preliminary scan is done under the control of the processor, and the data is returned to a suitable address in data memory 18. Then, the process is returned to step 24 and the next sequential block of data is obtained from data memory 18. On the other hand, if in step 27, a determination is made that the data is not character data, then, step 29, under the control of microprocessor 15, a determination is made as to whether there is an end of line control indicator. If there is not such a control indicator, the process is also returned to step 24. On the other hand, if there is such an end of line indicator, then the initial scanning of the line is completed and the formatting process shown in FIG. 3 is called.

Returning now to decision block 25, if the microprocessor 15 determines that a control ID byte 26 (FIG. 4) is read, this block of data is recognized as a control block. In such a case, a further determination is made, step 30, as to whether the control data block 22 meets all of the rules and protocols which the system may have required for control data. If all of the rules and protocols are met, then, a determination is made, step 31, still under the control of microprocessor 15 as to whether we have a line beginning control code, i.e., a control code which precedes any character data in a line. In a similar fashion, if a determination is made in block 30 that the control does not meet all the rules and protocols, then the host 11 is informed, step 32, for whatever action the host may wish to take to remedy the situation, and process still proceeds to step 31 where determination is made as to whether the control code is a line beginning code. If no character data has, as yet, been read on this line implying that the control code is a line beginning control code, then, step 33, the control code is removed by the processor moving the address pointer through internal address buss 21 to the next sequential position in data memory 18, and the processor is returned to step 24 where the next block is obtained from data memory 18.

On the other hand, if a determination is made in step 31 that the control block was preceded on the line by character data, then, under the control of microprocessor 15 new identical control code identifiers respectively labeled 26' and 26" are inserted at the front and at the rear control data block 22. These control identifiers 26' and 26" may be identical bytes of data. This procedure is set forth in step 34 of FIG. 2.

Next, step 35, the control block as shown in the bottom or "After Scan" line of FIG. 4 with control identifier bytes 26' and 26" is returned to appropriate storage buffer positions in data memory 18 and the process is returned to step 24 wherein the next block of data is obtained from the data memory.

The above described procedure involving the initial scan routine is repeated until a determination is made in step 29 that an end of line control indicator has been reached. This means that the initial scanning of the line has been completed and next step will be completion of whatever formatting for that particular line is to be done in the formatting unit of the printer. Thus, step 36 in FIG. 2, the formatting process of FIG. 3 is called. As stated hereinabove, it is not the purpose of this description to disclose the various conventional formatting operations which may be carried out in a formatting unit 12 associated with the printer. We will primarily describe how the formatting unit may distinguish a block of control data from a block of character data irrespective of the direction in which a bidirectional printer 10 may be printing the particular line being read by formatting unit 12.

Figure 3:
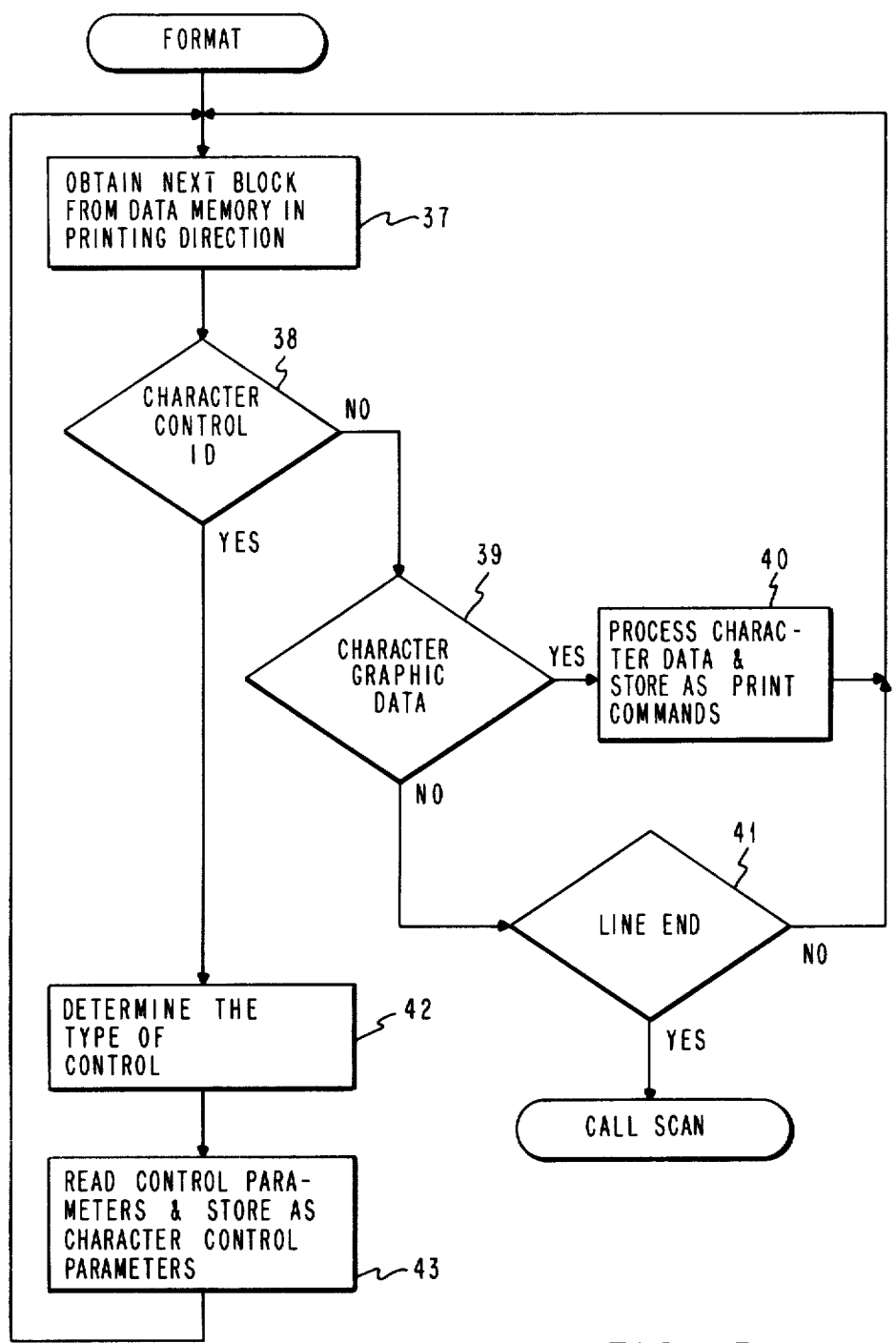
FIG. 3 is a flow chart of the formatting expedient involving the insertion of a control block identifier at the end of each control block.
Figure 4:
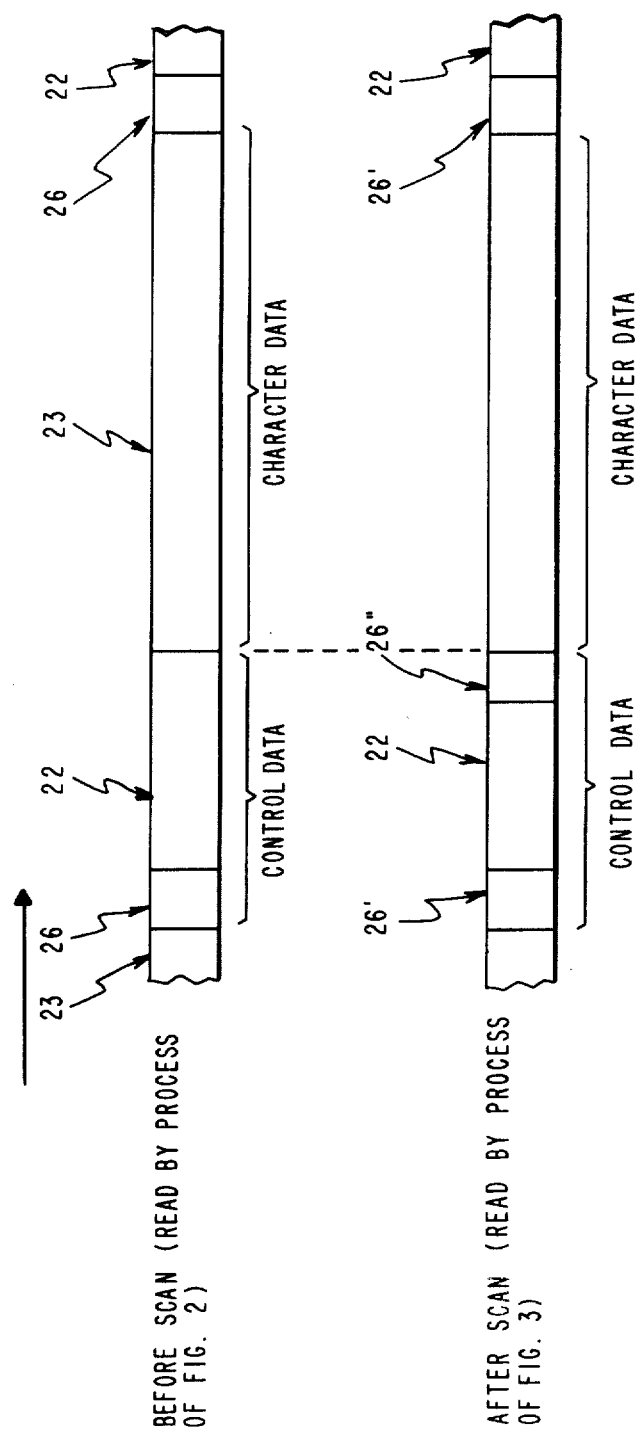
FIG. 4 is a diagrammatic representation of a portion of a sequential stream of data both before and after the data scan.

Thus, in the processor, FIG. 3, the next block of data is obtained from the data memory unit 18 in the direction which the printer is printing and therefore the line of data is being read. If printing is being carried out from left to right, blocks of data are being read in an ascending order. If printing is being carried out from right to left, the blocks of data are being read in a descending order. Then, step 38, a determination is made by the microprocessor 15 as to whether a control identifier, either 26' or 26" is present in the next block of data. If there is no control identifier, then a determination is made, step 39, as to whether the data is character data, i.e., data representative of actual characters to be printed. This determination is also made under the control of microprocessor 15. If microprocessor 15 determines that it is character data of the type indicated by block 23 in FIG. 4, then, step 40, this character data is processed to be put into the form required by the particular printer mechanism and stored as specific print commands for the conventional escapement and character selection mechanism of the particular printer mechanism 10 being utilized. These print commands are stored in an appropriate position in data memory unit 18. Then, the processor is returned to step 37 and the next sequential block of data is obtained from data memory 18. On the other hand, if in step 39, a determination is made that the data is not character data, then, step 41, under the control of microprocessor 15, a determination is made as to whether the entire line previously scanned has been processed. If the entire line has not been processed, then the process is also returned to step 37. On the other hand, if the entire line has been processed, then the formatting of the line is now completed, and the system is returned to call the scan process shown in FIG. 2 for the next line.

In returning now to decision block 38, if the microprocessor determines that a control ID byte 26' or 26" is read, this block of data is recognized as a control block. In such a case, step 42, the microprocessor 15 determines the control requirements, i.e., the types of formatting to be carried out in the formatting unit with respect to the character data. This is done, step 43, by the microprocessor 15 reading the necessary control parameters from program memory 17. This data is stored in a suitable place in data memory 18 as control parameters to be used to run the printer mechanism 10 in connection with the character data 23 which the control block 22 identified by identifiers 26' and 26". The processor is then return to step 37.

Upon the completion of the scan process of FIG. 2 and the formatting process of FIG. 3 with respect to each line, the commands necessary to control the printer mechanism 10 to print complete formatted line are now stored in data memory 18. This formatting operation will continue line by line. In the mean time as the printer mechanism 10 is printing the formatted lines, the processor 15 which controls the printing as well as the formatting operation will obtain the character data and control data necessary to provide the formatted lines from data memory 18 as required by the printer mechanism. These will be input to the printer mechanism through I/O port 19 over buss 14. In this connection it should be understood that the actual printing by printer mechanism 10 may trail the formatting being carried out in the formatting unit by several lines.

While the invention has been particularly shown and described with reference to a preferred embodiment it will be understood by those skilled in the art that various other changes in form and detail may be made without departing from the spirit and scope of the invention.

We claim:

1. In a bidirectional printer system, apparatus for converting sequential data readable in one direction representative of the format of the printed matter into data readable in either the forward or reverse directions comprising:
    means for sequentially storing blocks of data representations of the characters to be printed,
    means for storing blocks of control data representative of the format in which said characters are to be printed interspersed with said blocks of data representations of characters,
    means for storing control block identifier data at sequential storage positions both immediately preceding and at the end of said control data blocks, and
    means for reading said stored data sequentially in either the forward or the reverse direction,
    whereby said identifier data will be read prior to said control block data irrespective of whether stored data is being read in the forward or in the reverse direction.

2. A word processing system for producing formatted printed documents comprising
    a word processor having means for outputting a stream of sequential data readable in only one direction, said stream of data comprising blocks of character data representative of the characters to be printed interspersed with blocks of control data representative of the format in which the characters are to be printed, each block of control data having an immediately preceding control block identifier, and a bidirectional printer having
   means for receiving said stream of sequential data,
   means for scanning said stream of sequential data,
   means for inserting a control block identifier at the end of each control block, which identifier corresponds to the identifier preceding the control block,
   whereby said stream of sequential data is made readable in both forward and reverse direction, and
   means for reading said stream of sequential data in either the forward or reverse direction.

3. The word processing system of claim 2 wherein said word processor includes a display terminal and means for converting a stream of sequential data readable in only one direction into a display of formatted characters on said terminal.

4. In a bidirectional printer system having a structure for formatting data representative of the format of the printed matter comprising:
   means for sequentially storing blocks of data representations of the characters to be printed,
   means for storing blocks of control data representative of the format in which said characters are to be printed interspersed with said character data blocks,
   means for storing control block identifier data immediately preceding said control data blocks, and
   means for reading said stored data sequentially in either the forward or the reverse direction,
   a method for making the reading of said stored control data blocks compatible with a bidirectional printer comprising
   sequentially scanning said stored data, and inserting a control block identifier at the end of each control block, which identifier corresponds to the identifier preceding the control block.

5. In a word processing system for producing formatted printed documents comprising
   a word processor having means for outputting a stream of sequential data readable in only one direction, said stream of data comprising blocks of character data representative of the characters to be printed interspersed with blocks of control data representative of the format in which the characters are to be printed, each block of control data having an immediately preceding control block identifier, and
   a bidirectional printer having means for receiving said stream of sequential data, means for reading streams of sequential data in forward and reverse directions and means for printing said formatted document,
   the improvement comprising a method for making said stream of sequential data received by the printer readable in the forward or in the reverse direction by said reading means including the steps of
   scanning the stream of sequential data received by the printer, and
   inserting a control block identifier at the end of each control block, which identifier corresponds to the identifier preceding the control block.

* * * * *